April 21, 1964 — A. STRASMANN — 3,129,492
MILLING CUTTER
Filed April 16, 1962

INVENTOR.
Albert Strasmann
BY

United States Patent Office 3,129,492
Patented Apr. 21, 1964

3,129,492
MILLING CUTTER
Albert Strasmann, Remscheid-Ehringhausen, Germany, assignor to Albert Strasmann, Präzisions-Werkzeug- und Maschinenfabrik, Remscheid-Ehringhausen, Germany
Filed Apr. 16, 1962, Ser. No. 187,680
Claims priority, application Germany Apr. 25, 1961
6 Claims. (Cl. 29—103)

The present invention relates to milling cutters with eccentrically relieved teeth arranged along the turns of a thread and with the relieving operation carried out by turning or grinding. These teeth are arranged in groups with the teeth in each group being arranged adjacent to each other.

Milling cutters of this type have been known for quite some time and are provided with rounded teeth which, while producing a relatively rough machined surface, have a high output inasmuch as the feed can be selected relatively great.

Furthermore, milling cutters are known in which the individual eccentrically relieved teeth are flattened. These flat teeth bring about a surface which is almost as smooth as that obtained with a customary finishing cutter. This flat design of the teeth, however, considerably reduced the output of the milling cutter inasmuch as the feed cannot be selected as great as that of milling cutters having rounded-off teeth.

It is, therefore, an object of the present invention to provide a milling cutter which will overcome the above-mentioned drawbacks.

It is another object of this invention to provide a milling cutter which will combine the advantages of the above-mentioned two types of milling cutters without, however, having the drawbacks thereof.

Figure 1:
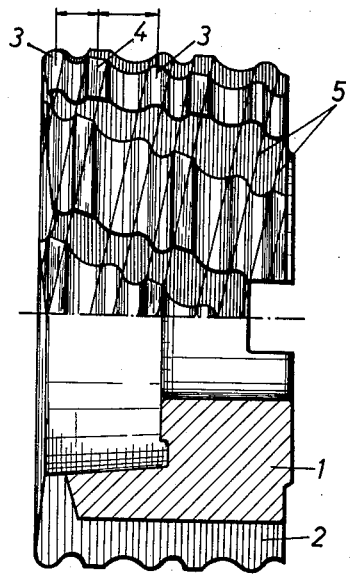

The invention is illustrated by way of example in the accompanying drawing, in which FIGURE 1 illustrates, partly in view and partly in section, a milling cutter according to the present invention.

Figure 2:
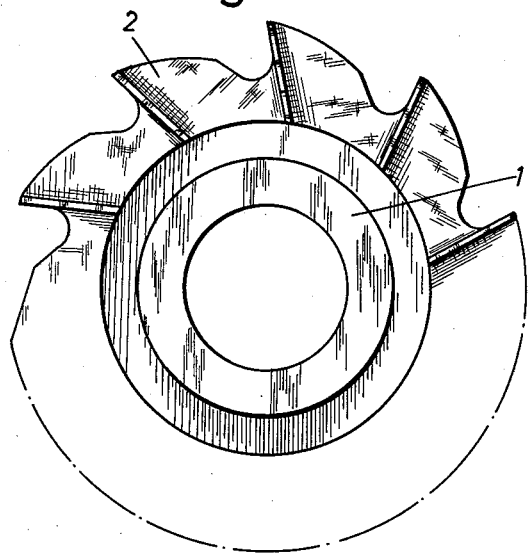

FIGURE 2 shows a side view of the cutter illustrated in FIGURE 1.

The milling cutter according to the present invention is characterized primarily in that each group of teeth considered in the axial direction of the cutter, comprises round roughing teeth and flattened finishing teeth arranged alternately, the cutting edges of said teeth being distributed over the entire cutter in a thread-like manner. In this way, the teeth are, similar to heretofore known milling cutters, arranged so that the teeth of one group are offset laterally with regard to the teeth of the respective following group. Preferably, the distance from one roughing tooth to the adjacent finishing tooth is not quite as great as the distance from said finishing tooth to the next following roughing tooth. By correspondingly selecting the distances, the different outputs of the two types of teeth can be so accommodated that all teeth will be substantially uniformly loaded and will be subject to a practically uniform wear.

Similar to heretofore known milling cutters, the milling cutter according to the present invention may have the cutting edges of the teeth arranged in the manner of a multiple thread, in which instance, for example, the cutting edges of different teeth are arranged along different thread pitches. The teeth themselves may be laterally relieved by the extent of the pitch angle.

More specifically, with reference to the drawing, the milling cutter 1 illustrated therein has a plurality of groups 2 with eccentrically relieved teeth, which relief may be produced by turning or grinding. The teeth of each group are arranged adjacent to each other in such a way that a rounded-off roughing tooth 3 alternates with a flattened finishing tooth 4. As will be seen from FIG. 1, the distance between the roughing teeth 3 and the finshing teeth 4 located on the right-hand side of and directly adjacent thereto is greater than the distance between said last-mentioned finishing teeth 4 and the next following rounded-off roughing teeth 3. Such an arrangement brings about that the round roughing teeth 3 will take off a relatively thick chip, whereas the flat finishing teeth 4 practically merely smooths the finished surface and takes off a very fine or thin chip.

As will be seen in particular from the upper portion of FIG. 1, the teeth 3 and 4 are laterally relieved by the amount of the pitch angle of a thread along which the cutting edges of the individual teeth are arranged. This thread is indicated by the thin lines 5.

In the foregoing, reference has been made to "roughing" teeth and to "finishing" teeth. It will be understood, however, that this is a designation primarily for convenience and that the teeth, while taking this type of cuts, may actually be removing about the same amount of material. It is the case, however, that the form imparted to the work-piece by the roughing teeth is irregular with respect to the desired flat surface and that it is the finishing teeth that remove the material left by the roughing teeth and produce a flat surface. With this in mind, it will be understood that it is not necessarily the case that the roughing teeth remove large amounts of material while the finishing teeth remove only small amounts of material but, rather, that the roughing teeth make primarily cuts in the surface and the finishing teeth then remove further material and finish the surface with respect to the contour desired.

It is, of course, to be understood that the present invention is, by no means, limited to the particular construction shown in the drawing but also comprises any modifications within the scope of the appended claims. In this connection, it should also be noted that while in the preceding specification and the following claims, the teeth are termed roughing and finishing teeth, actually, the milling cutter 1 is a roughing cutter with two types of teeth one of which takes out a differently shaped chip than the other one.

What I claim is:

1. A milling cutter with relieved teeth, in which the teeth are arranged in circumferentially spaced groups of teeth, each of said groups of teeth comprising roughening teeth with a rounded crown and finishing teeth with a flat crown arranged alongside each other so that in each of said groups said roughening teeth and said finishing teeth alternate with each other, each tooth having a cutting edge, the cutting edge of said roughening teeth respectively being located along helical lines and also the cutting edge of said finishing teeth respectively being located along helical lines.

2. A milling cutter with relieved teeth, in which the teeth are arranged in circumferentially spaced groups of teeth, each of said groups of teeth comprising roughening teeth with a rounded crown and finishing teeth with a flat crown arranged alongside each other so that in each of said groups said roughening teeth and said finishing teeth alternate with each other while the distance from a roughening tooth to the adjacent finishing tooth differs from the distance between the latter and the next adjacent roughening tooth, each tooth having a cutting edge, the cutting edge of said roughening teeth respectively being located along helical lines and also the cutting edge of said finishing teeth respectively being located along helical lines.

3. A milling cutter with relieved teeth, in which the teeth are arranged in circumferentially spaced groups of teeth, each tooth having a cutting edge, the cutting edge of said teeth being arranged along helical lines of a multi-thread, each of said groups of teeth comprising roughening teeth with a rounded crown and finishing teeth with a flat crown arranged alongside each other so that in each of said groups said roughening teeth and said finishing teeth alternate with each other, the cutting edge of said roughening teeth respectively being located along helical lines and also the cutting edge of said finishing teeth respectively being located along helical lines.

4. A milling cutter according to claim 3, in which the cutting edge of said roughening teeth and said finishing teeth are arranged on helical lines pertaining to different threads.

5. A milling cutter according to claim 1, in which said teeth are laterally relieved by an amount equalling the pitch angle of the helical lines.

6. A milling cutter comprising; a cylindrical body, a plurality of cutter teeth on the body projecting radially thereupon and arranged thereon in circumferentially spaced groups with the teeth of each group being distributed in spaced relation axially of the body, each tooth extending circumferentially of the body and having a cutting edge at the leading end thereof, each group of teeth comprising alternately arranged round crowned teeth and flat crowned teeth, each group of teeth being offset axially a predetermined distance in one and the same direction relative to the preceding group of teeth whereby the cutting edges of both the round crowned and flat crowned teeth in the several groups of teeth lie in helical paths, the distance between each round crowned tooth and the next adjacent flat crowned tooth in the same group in the said one direction being less than the distance between each flat crowned tooth and the next adjacent round crowned tooth in said one direction.

References Cited in the file of this patent

UNITED STATES PATENTS

| | | |
|---|---|---|
| 2,855,657 | Erhardt | Oct. 14, 1958 |
| 2,864,153 | Mahan | Dec. 16, 1958 |

FOREIGN PATENTS

| | | |
|---|---|---|
| 8,725 | Great Britain | Apr. 15, 1902 |
| 27,153 | Sweden | Sept. 11, 1907 |
| 438,354 | Germany | Dec. 13, 1926 |
| 319,309 | Switzerland | Feb. 15, 1957 |